US012644433B2

(12) United States Patent
Zhang et al.

(10) Patent No.: US 12,644,433 B2
(45) Date of Patent: Jun. 2, 2026

(54) BROADBAND OSCILLATION SUPPRESSION METHOD AND APPARATUS FOR WIND-STORAGE COMBINATION

(71) Applicant: CHINA THREE GORGES CORPORATION, Wuhan (CN)

(72) Inventors: Wei Zhang, Wuhan (CN); Ruikuo Liu, Wuhan (CN)

(73) Assignee: CHINA THREE GORGES CORPORATION (CN)

( * ) Notice: Subject to any disclaimer, the term of this patent is extended or adjusted under 35 U.S.C. 154(b) by 0 days.

(21) Appl. No.: 18/857,835

(22) PCT Filed: Aug. 31, 2023

(86) PCT No.: PCT/CN2023/116155
§ 371 (c)(1),
(2) Date: Oct. 18, 2024

(87) PCT Pub. No.: WO2024/098908
PCT Pub. Date: May 16, 2024

(65) Prior Publication Data
US 2025/0264085 A1 Aug. 21, 2025

(30) Foreign Application Priority Data

Nov. 11, 2022 (CN) .......................... 202211412389.1

(51) Int. Cl.
*F03D 7/04* (2006.01)
*F03D 7/02* (2006.01)
*H02J 3/24* (2006.01)

(52) U.S. Cl.
CPC ........... *F03D 7/0284* (2013.01); *F03D 7/042* (2013.01); *H02J 3/24* (2013.01)

(58) Field of Classification Search
CPC F03D 7/0284; F03D 7/042; H02J 3/24; H02J 2300/28
See application file for complete search history.

(56) References Cited

U.S. PATENT DOCUMENTS

2025/0264085 A1* 8/2025 Zhang .................... F03D 7/042

FOREIGN PATENT DOCUMENTS

CN 107615186 A 1/2018
CN 113890056 A * 1/2022 .............. H02J 3/466

* cited by examiner

*Primary Examiner* — Christopher R Legendre

(57) ABSTRACT

An invention offers a broadband oscillation suppression method and apparatus for wind-storage combinations. The method involves several steps: first, acquiring the operational state of a wind-storage station system at an initial moment. Next, different control variables and this operational state are input into a prediction model to identify two wind turbine frequencies and their corresponding operational states for a subsequent moment. Then, these control variables and the new operational states are used in the prediction model to derive wind turbine frequencies for a third moment. Finally, a control variable from the initial moment, linked to the wind turbine frequency with the lowest value function among the two frequencies at the third moment, is selected as the final control variable for managing the wind turbine and energy storage system. The method effectively reduces regulation costs during broadband oscillation suppression, enhancing the operational safety and stability of the wind-storage station.

8 Claims, 4 Drawing Sheets

Wind turbine

Wind turbine state $I_{WT}$

Oscillation controller $f$ $I_{ES}$

Energy storage
state

Energy storage

Transformer
35kV / 690V

Collector
cable

Transformer
35kV / 690V

Collector
cable

Grid connection point
of wind-storage
station 220 kV $Z_L$

Transformer
220kV / 35kV

Infinite bus
220 kV

Failure point

Transmission
cable

Transmission
cable

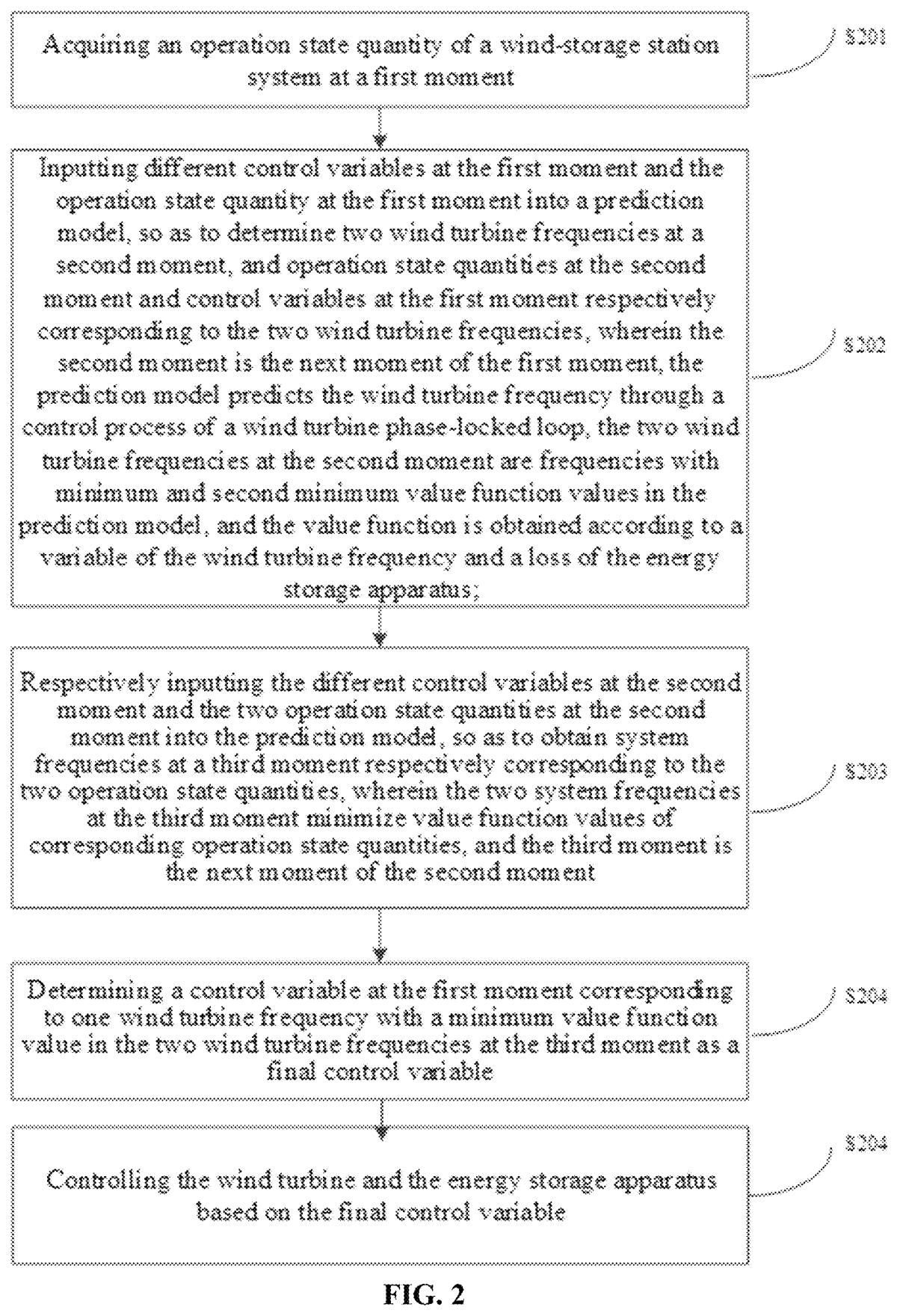

Acquiring an operation state quantity of a wind-storage station system at a first moment — S201

Inputting different control variables at the first moment and the operation state quantity at the first moment into a prediction model, so as to determine two wind turbine frequencies at a second moment, and operation state quantities at the second moment and control variables at the first moment respectively corresponding to the two wind turbine frequencies, wherein the second moment is the next moment of the first moment, the prediction model predicts the wind turbine frequency through a control process of a wind turbine phase-locked loop, the two wind turbine frequencies at the second moment are frequencies with minimum and second minimum value function values in the prediction model, and the value function is obtained according to a variable of the wind turbine frequency and a loss of the energy storage apparatus; — S202

Respectively inputting the different control variables at the second moment and the two operation state quantities at the second moment into the prediction model, so as to obtain system frequencies at a third moment respectively corresponding to the two operation state quantities, wherein the two system frequencies at the third moment minimize value function values of corresponding operation state quantities, and the third moment is the next moment of the second moment — S203

Determining a control variable at the first moment corresponding to one wind turbine frequency with a minimum value function value in the two wind turbine frequencies at the third moment as a final control variable — S204

Controlling the wind turbine and the energy storage apparatus based on the final control variable — S204

FIG. 2

BROADBAND OSCILLATION SUPPRESSION METHOD AND APPARATUS FOR WIND-STORAGE COMBINATION

FIELD OF THE INVENTION

The embodiment of the present invention relates to the field of electric power, and particularly to a broadband oscillation suppression method and apparatus for wind-storage combination.

BACKGROUND OF THE INVENTION

During a short-circuit fault of a power grid, a frequency deviation of a wind-storage station is regulated by an active output of a wind turbine and an energy storage apparatus, so as to reduce an instability risk of the wind-storage station, improve the stability of an electric power system, and avoid broadband oscillation and divergence. Although the energy storage apparatus has the characteristics of fast response and flexible control, the cost is high, and the energy storage apparatus is easily damaged by frequent large-scale charging and discharging. In the prior art, when broadband oscillation suppression for wind-storage combination is controlled, the output of the energy storage apparatus is only controlled according to a frequency deviation of a wind turbine, without considering a regulation cost of charging and discharging of the energy storage apparatus, and the operation safety and stability of the wind-storage station need to be further improved.

SUMMARY OF THE INVENTION

In order to reduce a regulation cost during broadband oscillation suppression of a wind-storage station, thereby improving the operation safety and stability of the wind-storage station, the present invention provides a broadband oscillation suppression method and apparatus for wind-storage combination.

In the first aspect, the present invention provides a broadband oscillation suppression method for wind-storage combination, the method comprises the following steps of:

acquiring an operation state quantity of the wind-storage station system at a first moment;

inputting different control variables at the first moment and the operation state quantity at the first moment into a prediction model, so as to determine two wind turbine frequencies at a second moment, and operation state quantities at the second moment and control variables at the first moment respectively corresponding to the two wind turbine frequencies, wherein the second moment is the next moment of the first moment, the prediction model predicts the wind turbine frequency through a control process of a wind turbine phase-locked loop, the two wind turbine frequencies at the second moment are frequencies with minimum and second minimum value function values in the prediction model, and the value function is obtained according to a variable of the wind turbine frequency and a loss of the energy storage apparatus;

respectively inputting the different control variables at the second moment and the two operation state quantities at the second moment into the prediction model, so as to obtain wind turbine frequencies at a third moment respectively corresponding to the two operation state quantities, wherein the two wind turbine frequencies at the third moment minimize value function values of corresponding operation state quantities, and the third moment is the next moment of the second moment;

determining a control variable at the first moment corresponding to one wind turbine frequency with a minimum value function value in the two wind turbine frequencies at the third moment as a final control variable; and controlling the wind turbine and the energy storage apparatus based on the final control variable.

Considering that the energy storage apparatus may be damaged by frequent charging and discharging of the energy storage apparatus in the case of broadband oscillation suppression of the wind-storage station during the failure of the power grid, in the method provided by the embodiment of the present invention, a combination of a variable of the wind turbine frequency and the charging and discharging loss of the energy storage apparatus is used as the regulation cost to optimally distribute the wind turbine active current and the energy storage apparatus active current. In addition, in order to prevent the oscillation and divergence of a control system in a single-step prediction method, two-step prediction is adopted, two better results selected in first prediction are used for the second prediction, and the final control variable is determined according to the value function value of the second prediction, which can reduce the regulation cost of the energy storage apparatus while realizing the broadband oscillation suppression of the system, and improve the operation safety and stability of the wind-storage station.

According to the first aspect, in the first embodiment, the variable of the wind turbine frequency is a difference between a wind turbine frequency at a current moment and a predetermined frequency, and the value function is obtained by summing up the difference between the wind turbine frequency at the current moment and the predetermined frequency and a loss of the energy storage apparatus at the current moment.

According to the first aspect, in the second embodiment, the determining the control variable at the first moment corresponding to one wind turbine frequency with the minimum value function value in the two wind turbine frequencies at the third moment as the final control variable, comprises:

determining an operation state quantity at the second moment corresponding to one wind turbine frequency with the minimum value function value in the two wind turbine frequencies at the third moment as a final operation state quantity at the second moment; and using a control variable at the first moment corresponding to the final operation state quantity at the second moment as the final control variable.

According to the first aspect, in the third embodiment, the value function is expressed as follows:

$$F(k) = \alpha_f F_f(k) + \beta_I F_I(k)$$

wherein, F(k) represents a value function at a moment k, $F_f(k)$ is a difference between a wind turbine frequency at the moment k and the predetermined frequency, $F_I(k)$ is a loss of the energy storage apparatus at the moment k, and $\alpha_f$ and $\beta_I$ are weight coefficients.

According to the first aspect, in the fourth embodiment, the prediction model comprises a phase-locked loop sub-model and a value function, and the inputting different control variables at the first moment and the operation state quantity at the first moment into the prediction model, so as to determine two wind turbine frequencies at the second moment, and the operation state quantities at the second moment and the control variables at the first moment respectively corresponding to the two wind turbine frequencies, comprises:

inputting different control variables at the first moment and the operation state quantity at the first moment into the phase-locked loop sub-model to obtain a plurality of wind turbine frequencies at the second moment and operation state quantities respectively corresponding to the wind turbine frequencies, wherein the control variables are in one-to-one correspondence with the wind turbine frequencies; and selecting the two wind turbine frequencies at the second moment, and the operation state quantities at the second moment and the control variables at the first moment respectively corresponding the two wind turbine frequencies according to the value function.

According to the fourth embodiment of the first aspect, in the fifth embodiment, after inputting different control variables at the first moment and the operation state quantity at the first moment into the phase-locked loop sub-model to obtain the plurality of wind turbine frequencies at the second moment and the operation state quantities respectively corresponding to the wind turbine frequencies, and before selecting the two wind turbine frequencies at the second moment, and the operation state quantities at the second moment and the control variables at the first moment respectively corresponding the two wind turbine frequencies according to the value function, the method further comprises the following step of:

when current information corresponding to the wind turbine frequency meets a constraint condition, executing the step of selecting the two wind turbine frequencies at the second moment, and the operation state quantities at the second moment and the control variables at the first moment respectively corresponding the two wind turbine frequencies according to the value function.

According to the fifth embodiment of the first aspect, in the sixth embodiment, the constraint condition is determined by a wind turbine current, a wind turbine active current and an increment thereof, a wind turbine reactive current and an increment thereof, and an energy storage apparatus current and an increment thereof.

The present invention further provides a broadband oscillation suppression apparatus for wind-storage combination, the apparatus comprises:

an acquisition module configured for acquiring an operation state quantity of a wind-storage station system at a first moment;

a first determination module configured for inputting different control variables at the first moment and the operation state quantity at the first moment into a prediction model, so as to determine two wind turbine frequencies at a second moment, and operation state quantities at the second moment and control variables at the first moment respectively corresponding to the two wind turbine frequencies, wherein the second moment is the next moment of the first moment, the prediction model predicts the wind turbine frequency through a control process of a wind turbine phase-locked loop, the two wind turbine frequencies at the second moment are frequencies with minimum and second minimum value function values in the prediction model, and the value function is obtained according to a variable of the wind turbine frequency and a loss of the energy storage apparatus;

a second determination module configured for respectively inputting the different control variables at the second moment and the two operation state quantities at the second moment into the prediction model, so as to obtain wind turbine frequencies at a third moment respectively corresponding to the two operation state quantities, wherein the two wind turbine frequencies at the third moment minimize value function values of corresponding operation state quantities, and the third moment is the next moment of the second moment;

a third determination module configured for determining a control variable at the first moment corresponding to one wind turbine frequency with a minimum value function value in the two wind turbine frequencies at the third moment as a final control variable; and a control module configured for controlling the wind turbine and the energy storage apparatus based on the final control variable.

Considering that the energy storage apparatus may be damaged by frequent charging and discharging of the energy storage apparatus in the case of broadband oscillation suppression of the wind-storage station during the failure of the power grid, in the method provided by the embodiment of the present invention, a combination of a variable of the wind turbine frequency and the charging and discharging loss of the energy storage apparatus is used as the regulation cost to optimally distribute the wind turbine active current and the energy storage apparatus active current. In addition, in order to prevent the oscillation and divergence of a control system in a single-step prediction method, two-step prediction is adopted, two better results selected in first prediction are used for the second prediction, and the final control variable is determined according to the value function value of the second prediction, which can reduce the regulation cost of the energy storage apparatus while realizing the broadband oscillation suppression of the system, and improve the operation safety and stability of the wind-storage station.

The present invention further provides a computer device, which comprises a memory and a processor, wherein the memory and the processor are in communication connection with each other, the memory stores a computer instruction, and the processor executes the steps of the broadband oscillation suppression method for wind-storage combination in the first aspect or any embodiment of the first aspect by executing the computer instruction.

The present invention further provides a computer-readable storage medium, which stores a computer program, wherein, when executed by a processor, the computer program executes the steps of the broadband oscillation suppression method for wind-storage combination in the first aspect or any embodiment of the first aspect.

BRIEF DESCRIPTION OF DRAWINGS

To describe the embodiments of the present invention or the technical solutions in the prior art more clearly, the following briefly introduces the accompanying drawings required for describing the embodiments or the descriptions in the prior art.

FIG. 2 is a flow chart of a broadband oscillation suppression method for wind-storage combination according to one exemplary embodiment;

DETAILED DESCRIPTION OF THE INVENTION

The technical solutions in the embodiments of the present invention will be clearly and completely described as follows in combination with the drawings in the examples of the present invention, but obviously, the described examples are only a part of the embodiments of the present invention, rather than all the embodiments. Based on the examples of the present invention, all other examples obtained by a person skilled in the art without creative efforts shall fall within the protection scope of the present invention.

In addition, the technical features involved in the different embodiments of the present invention described as follows may be combined with each other as long as they do not conflict with each other.

Figure 1:
FIG. 1 is a system diagram of broadband oscillation suppression for wind-storage station system combination when a power grid fails in one example.
Figure 3:
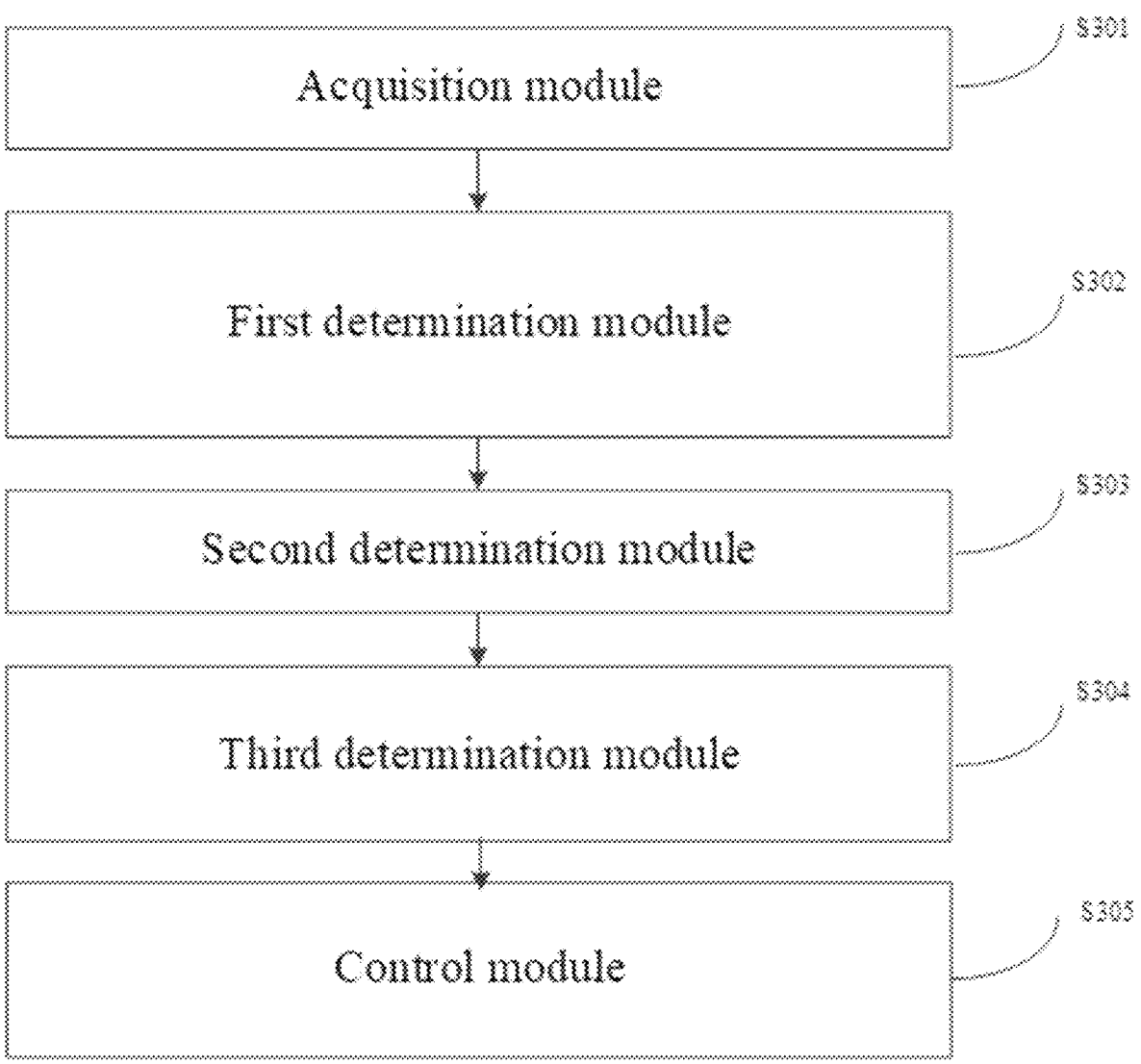
FIG. 3 is a schematic structural diagram of a broadband oscillation suppression apparatus for wind-storage combination according to one exemplary embodiment.

FIG. 1 is a system diagram of broadband oscillation suppression for wind-storage station system combination. When a power grid fails, a wind turbine enters a low voltage ride-through operation stage, and broadband oscillation occurs. At this time, the wind-storage station system realizes the broadband oscillation suppression by regulating a wind turbine active current and an energy storage apparatus current, so that a wind turbine frequency $f_p$ changes within a preset range, which is namely $|f_p - f_{ref}| < 0.5$ Hz, and $f_{ref}$ is a predetermined frequency of 50 Hz. However, frequent charging and discharging of an energy storage apparatus may cause a loss of the energy storage apparatus, so that a regulation cost of the wind-storage station should also be considered during broadband oscillation suppression.

In order to reduce the regulation cost during the broadband oscillation suppression of the wind-storage station system, thereby improving the operation safety and stability of the wind-storage station, the present invention provides a broadband oscillation suppression method and apparatus for wind-storage combination, a computer device and a medium.

FIG. 2 is a flow chart of the broadband oscillation suppression method for wind-storage combination according to one exemplary embodiment. As shown in FIG. 2, the broadband oscillation suppression method for wind-storage combination comprises the following steps S201 to S205.

In step S201, an operation state quantity of the wind-storage station system at a first moment is acquired.

Specifically, the operation state quantity of the wind-storage station system comprises a grid connection point voltage and a phase-locked loop output phase.

In step S202, different control variables at the first moment and the operation state quantity at the first moment are input into a prediction model, so as to determine two wind turbine frequencies at a second moment, and operation state quantities at the second moment and control variables at the first moment respectively corresponding to the two wind turbine frequencies, wherein the second moment is the next moment of the first moment, the prediction model predicts the wind turbine frequency through a control process of a wind turbine phase-locked loop, the two wind turbine frequencies at the second moment are frequencies with minimum and second minimum value function values in the prediction model, and the value function is obtained according to a variable of the wind turbine frequency and a loss of the energy storage apparatus.

Specifically, the control variables comprise a wind turbine active current and an energy storage apparatus current, and during failure of a power grid, the broadband oscillation suppression is realized by regulating an output active current of the wind turbine and an output current of the energy storage apparatus. The prediction model comprises a phase-locked loop sub-model and a value function, the phase-locked loop sub-model may predict wind turbine frequencies and operation state quantities at the next moment corresponding to the control variables through the operation state quantities and different control variables. The value function is used for calculating a regulation cost of the system on broadband oscillation suppression, which is determined according to a difference between the wind turbine frequency and a predetermined frequency and a charging and discharging loss of the energy storage apparatus.

In step S203, the different control variables at the second moment and the two operation state quantities at the second moment are respectively input into the prediction model, so as to obtain wind turbine frequencies at a third moment respectively corresponding to the two operation state quantities, wherein the two wind turbine frequencies at the third moment minimize value function values of corresponding operation state quantities, and the third moment is the next moment of the second moment.

In step S204, a control variable at the first moment corresponding to one wind turbine frequency with a minimum value function value in the two wind turbine frequencies at the third moment is determined as a final control variable.

Firstly, value function values corresponding to the two wind turbine frequencies at the third moment are compared to obtain the wind turbine frequency with the minimum value function value at the third moment, then an operation state quantity at the second moment corresponding to the frequency is determined, and a control variable at the first moment corresponding to the operation state quantity at the second moment is determined as the final control variable.

In the step S202 to the step S204 above, through two-step prediction, the value function value after two-step prediction is obtained, and the control variable at the first moment that minimizes the value function value after two-step prediction is selected as the final control variable.

In step S205, the wind turbine and the energy storage apparatus are controlled based on the final control variable.

Considering that the energy storage apparatus may be damaged by frequent charging and discharging of the energy storage apparatus in the case of broadband oscillation suppression of the wind-storage station during the failure of the power grid, in the method provided by the embodiment of the present invention, a combination of a variable of the wind turbine frequency and the charging and discharging loss of the energy storage apparatus is used as the regulation cost to optimally distribute the wind turbine active current and the energy storage apparatus active current. In addition, in order to prevent the oscillation and divergence of a control system in a single-step prediction method, two-step prediction is adopted, two better results selected in first prediction are used for the second prediction, and the final control variable is determined according to the value function value of the second prediction, which can reduce the regulation cost of the energy storage apparatus while realizing the broadband oscillation suppression of the system, and improve the operation safety and stability of the wind-storage station.

In one example, the variable of the wind turbine frequency is a difference between a wind turbine frequency at a current moment and a predetermined frequency, and the value function is obtained by summing up the difference between the wind turbine frequency at the current moment and the predetermined frequency and a loss of the energy storage apparatus at the current moment.

In one optional embodiment, the value function is expressed as follows:

$$F(k) = \alpha_f F_f(k) + \beta_I F_I(k)$$

wherein, F(k) represents a value function at a moment k, $F_f(k)$ is a difference between a wind turbine frequency at the moment k and the predetermined frequency, $F_I(k)$ is a loss of the energy storage apparatus at the moment k, and $\alpha_f$ and $\beta_I$ are weight coefficients.

Illustratively, the $F_f(k)$ and the $F_I(k)$ may also be obtained by normalizing a difference $f_f(k)$ of the wind turbine frequency and a loss $f_I(k)$ of the energy storage apparatus, and the $f_f(k)$ and the $f_I(k)$ are expressed as follows:

$$f_f(k) = |f_p(k) - f_{ref}|$$
$$f_I(k) = a(\Delta I_{ES}(k))^2 + b\Delta I_{ES}(k)$$

wherein, $f_p(k)$ represents a wind turbine frequency at a moment k, $f_{ref}$ represents a predetermined frequency of 50 Hz, a and b represent a current squared internal loss coefficient and a current linear internal loss coefficient of the energy storage apparatus, and $\Delta I_{ES}(k)$ represents a current increment of the energy storage apparatus. A normalization process is as follows:

$$F_i(k) = \frac{x_i(k) - x_{imin}}{x_{imax} - x_{imin}}$$

wherein, when $F_i(k)$ is the $F_f(k)$, $x_{imax}$ and $x_{imin}$ are a maximum value and a minimum value of the $f_f(k)$ respectively; and when $F_i(k)$ is the $F_I(k)$, $x_{imax}$ and $x_{imin}$ are a maximum value and a minimum value of the $f_I(k)$ respectively.

In one example, in the step S204 above, in order to prevent the oscillation and divergence of the control system in the single-step prediction method, the two-step prediction method is adopted, two better results selected in the first prediction are used for the second prediction, and the final control variable is determined according to the value function value of the second prediction, which comprises specific steps as follows:

Firstly, an operation state quantity at the second moment corresponding to one wind turbine frequency with the minimum value function value in the two wind turbine frequencies at the third moment is determined as a final operation state quantity at the second moment.

Then, a control variable at the first moment corresponding to the final operation state quantity at the second moment is used as the final control variable.

In one example, in the step S202 above, the prediction model comprises a phase-locked loop sub-model and a value function, and the inputting different control variables at the first moment and the operation state quantity at the first moment into the prediction model, so as to determine two wind turbine frequencies at the second moment, and the operation state quantities at the second moment and the control variables at the first moment respectively corresponding to the two wind turbine frequencies, comprises specific steps as follows.

Firstly, different control variables at the first moment and the operation state quantity at the first moment are input into the phase-locked loop sub-model to obtain a plurality of wind turbine frequencies at the second moment and operation state quantities respectively corresponding to the wind turbine frequencies, wherein the control variables are in one-to-one correspondence with the wind turbine frequencies.

Then, when current information corresponding to the wind turbine frequency meets a constraint condition, the two wind turbine frequencies at the second moment, and the operation state quantities at the second moment and the control variables at the first moment respectively corresponding the two wind turbine frequencies are selected according to the value function.

In one optional embodiment, the constraint condition is determined by a wind turbine current, a wind turbine active current and an increment thereof, a wind turbine reactive current and an increment thereof, and an energy storage apparatus current and an increment thereof.

Illustratively, for the wind turbine, an output current of a wind turbine set at any moment k needs to meet a constraint of a rated current, and an increment of the output current needs to meet a constraint of a maximum current increment. Therefore, the constraint condition is expressed as follows:

$$\begin{cases} I_{WT}(k) \le I_N \\ I_{WTd}(k) \le I_{WTd\_max} \\ I_{WTq}(k) \le I_{WTq\_max} \\ \Delta I_{WTd}(k) \le \Delta I_{WTd\_max} \\ \Delta I_{WTq}(k) \le \Delta I_{WTq\_max} \end{cases}$$

wherein, $I_{WT}$ is the wind turbine current, $I_N$ is a rated value of the wind turbine current, $I_{WTd}$ and $I_{WTq}$ are the wind turbine active current and the wind turbine reactive current respectively, $I_{WTd\_max}$ and $I_{WTq\_max}$ are a maximum value of the wind turbine active current and a maximum value of the wind turbine reactive current respectively, $\Delta I_{WTd}$ and $\Delta I_{WTq}$ are the increment of the wind turbine active current and the increment of the wind turbine reactive current in unit control time respectively, and $\Delta I_{WTd\_max}$ and $\Delta I_{WTq\_max}$ are a maximum value of the increment of the wind turbine active current and a maximum value of the increment of the wind turbine reactive current in unit control time respectively.

Illustratively, for the energy storage apparatus, an output current $I_{ES}$ of the energy storage apparatus at any moment k needs to meet a constraint of a rated current, and an increment $\Delta I_{ES}$ of the output current needs to meet a constraint of a maximum current increment:

$$\begin{cases} I_{ES}(k) \le I_{ESN} \\ \Delta I_{ES}(k) \le \Delta I_{ES\_max} \end{cases}$$

wherein, $I_{ESN}$ and $\Delta I_{ES\_max}$ are the rated current of the energy storage apparatus and a maximum value of the current increment in unit control time respectively.

In one example, when the wind turbine enters a low-voltage ride-through operation stage, in the case that a grid connection point voltage of the wind-storage station at the moment k is $U_t(k)$ during the failure, the grid voltage drops, and then, according to regulations of an electric power system, an increment $\Delta I_{WTqref}$ of a reactive current output by the wind turbine at a moment k+1 is expressed as follows:

$$\Delta I_{WTqref}(k+1) = K_1 \times (0.9 - U_t(k)) \times I_N$$

wherein, k is a discrete moment in a time period when an oscillation controller of the wind-storage station controls the wind turbine and energy storage based on the method in the patent after the wind turbine enters the low-voltage ride-through operation stage, and k=1, 2, . . . , N. $U_t(k)$ is a per-unit value of the grid connection point voltage of the wind-storage station at the moment k during the failure. $K_1$ is a dynamic reactive current proportionality coefficient of a wind power station, and a value range of $K_1$ should be not less than 1.5, preferably not greater than 3; $U_t$ is a grid connection point voltage of the wind power station; and $I_N$ is a rated current of the wind power station.

Considering the limitation of ability of the wind turbine to provide the reactive current, the increment $\Delta I_{WTq}$ of the reactive current actually compensated by the wind turbine at the moment k+1 is:

$$\Delta I_{WTq}(k+1) = \min(\Delta I_{WTqref}(k+1), \Delta I_{WTq\_max})$$

wherein, $\Delta I_{WTq\_max}$ is a maximum value of the increment of the wind turbine reactive current in unit control time.

Then, a reactive current $I_{WTq}(k+1)$ to be output by the wind turbine at the moment k+1 is:

$$I_{WTq}(k+1) = I_{WTq}(k) + \Delta I_{WTq}(k+1)$$

In one example, the phase-locked loop sub-model in the prediction model uses a phase-locked loop to acquire a frequency and a phase of the grid connection point voltage $U_t$ of the wind-storage station, and a continuous mathematical model thereof is expressed as follows:

$$\begin{cases} \dfrac{dx}{dt} = U_{tq} \\ \dfrac{d\theta_p}{dt} = \omega_p \\ \omega_p = K_{pp} U_{tq} + K_{pi} x \end{cases}$$

wherein, x is an intermediate state variable introduced by the phase-locked loop sub-model, $U_{tq}$ is a q-axis component in a phase-locked loop coordinate system in the phase-locked loop sub-model, $\omega_p$ and $\theta_p$ are an angular frequency and an angular phase output by the phase-locked loop respectively, $K_{pp}$ and $K_{pi}$ are a proportionality coefficient and an integral coefficient of a phase-locked loop PI controller respectively, and t represents control time.

Then, the wind turbine frequency $f_p$ is:

$$f_p = \frac{\omega_p}{2\pi}$$

The phase-locked loop sub-model may be written in a form of state equation:

$$\begin{bmatrix} \dfrac{dx}{dt} \\ \dfrac{d\theta_p}{dt} \end{bmatrix} = \begin{bmatrix} 0 & 0 \\ K_{pi} & 0 \end{bmatrix} \begin{bmatrix} x \\ \theta_p \end{bmatrix} + \begin{bmatrix} 1 \\ K_{pp} \end{bmatrix} U_{tq}$$

$$\omega_p = [K_{pi}\ 0] \begin{bmatrix} x \\ \theta_p \end{bmatrix} + K_{pp} U_{tq}$$

By a discrete method, a continuous form of the above phase-locked loop sub-model is converted into a discrete-time standard form $f_p\{x(k),u(k)\}$ of a linearized phase-locked loop sub-model:

$$\begin{cases} x_1(k+1) = A_d x_1(k) + B_d u(k) \\ y(k) = C_d x(k) + D_d u(k) \end{cases}$$

$$x_1(k) = [x(k), \theta_p(k)], \ y(k) = \omega_p(k), \ u(k) = U_{tq},$$

wherein, $A_d = \begin{bmatrix} 1 & 0 \\ TK_{pi} & 1 \end{bmatrix}$, $B_d = \begin{bmatrix} 1 \\ TK_{pp} \end{bmatrix}$, $C_d = [K_{pi}\ 0]$, $D_d = K_{pp}$, $A_d$, $B_d$ and $C_d$ are a state matrix, a control input matrix and an output matrix respectively, and T is a sampling period of the controller.

In the phase-locked loop sub-model, a current $I_{WT}(k+1)$ to be output by the wind turbine at the moment k+1 may be expressed as follows:

$$I_{WT}(k+1) = \sqrt{I_{WTd}(k+1)^2 + I_{WTq}(k+1)^2}$$

wherein, $I_{WTd}(k+1)$ is an active current to be output by the wind turbine at the moment k+1, and $I_{WTq}(k+1)$ is a reactive current of the wind turbine at the moment k+1.

Active power is output by using stored energy during the failure, which can reduce an angle difference between a grid connection point voltage $U_t$ and a failure point voltage $U_G$ of an electric field, thereby reducing the instability risk of the system. In order to realize the economic operation of the energy storage apparatus, only an active current output of the energy storage apparatus is considered, without considering a reactive current output, and an active current $I_{ES}(k+1)$ to be output by the energy storage apparatus at the moment k+1 is:

$$I_{ES}(k+1) = I_{ES}(k) + \Delta I_{ES}(k+1)$$

wherein, $\Delta I_{ES}(k+1)$ is an increment of the current output by the energy storage apparatus at the moment k+1.

A combined current $I_s(k)$ output by the wind-storage station system at any moment k is:

$$I_s(k) = \sqrt{(I_{WTd}(k) + I_{ES}(k))^2 + I_{WTq}(k)^2}$$

When the power grid system fails, based on the q-axis component in the phase-locked loop coordinate system in the phase-locked loop sub-model, the grid connection point voltage $U_r(k)$ of the wind-storage station may be expressed as:

$$U_{tq}(k) = U_G(k)\sin\delta(k) - I_s(k)Z_L\sin(\theta_I(k) + \theta_Z)$$

wherein, $U_G(k)$ is a failure point voltage, $Z_L$ is a grid impedance, which generally comprises an impedance between a failure point and a grid connection point, $\theta_I(k)$ and $\theta_Z$ are a phase angle of a grid connection point current and a phase angle of the grid impedance $Z_L$ of the wind-storage station at the moment k in the phase-locked loop coordinate system respectively, and $\delta(k)$ is an angle difference between the grid connection point voltage $U_r(k)$ and the failure point voltage $U_G(k)$ of the wind-storage station at the moment k.

Based on the same inventive concept, the embodiment of the present invention further provides a broadband oscillation suppression apparatus for wind-storage combination, as shown in FIG. 1, the apparatus comprises:

an acquisition module S301, configured for acquiring an operation state quantity of a wind-storage station system at a first moment; for detailed information, please refer to the description of step S201 in the above embodiment, which will not be repeated here.

a first determination module S302, configured for inputting different control variables at the first moment and the operation state quantity at the first moment into a prediction model, so as to determine two wind turbine frequencies at a second moment, and operation state quantities at the second moment and control variables at the first moment respectively corresponding to the two wind turbine frequencies, wherein the second moment is the next moment of the first moment, the prediction model predicts the wind turbine frequency through a control process of a wind turbine phase-locked loop, the two wind turbine frequencies at the second moment are frequencies with minimum and second minimum value function values in the prediction model, and the value function is obtained according to a variable of the wind turbine frequency and a loss of the energy storage apparatus; for detailed information, please refer to the description of step S202 in the above embodiment, which will not be repeated here.

a second determination module S303, configured for respectively inputting the different control variables at the second moment and the two operation state quantities at the second moment into the prediction model, so as to obtain wind turbine frequencies at a third moment respectively corresponding to the two operation state quantities, wherein the two wind turbine frequencies at the third moment minimize value function values of corresponding operation state quantities, and the third moment is the next moment of the second moment; for detailed information, please refer to the description of step S203 in the above embodiment, which will not be repeated here.

a third determination module S304, configured for determining a control variable at the first moment corresponding to one wind turbine frequency with a minimum value function value in the two wind turbine frequencies at the third moment as a final control variable; for detailed information, please refer to the description of step S204 in the above embodiment, which will not be repeated here, and a control module S305, configured for controlling the wind turbine and the energy storage apparatus based on the final control variable, for detailed information, please refer to the description of step S205 in the above embodiment, which will not be repeated here.

In one example, in a first determination module 302, the variable of the wind turbine frequency is a difference between a wind turbine frequency at a current moment and a predetermined frequency, and the value function is obtained by summing up the difference between the wind turbine frequency at the current moment and the predetermined frequency and a loss of the energy storage apparatus at the current moment.

In one example, a third determination module 304 comprises:

a first determination sub-module configured for determining an operation state quantity at the second moment corresponding to one wind turbine frequency with the minimum value function value in the two wind turbine frequencies at the third moment as a final operation state quantity at the second moment, wherein details refer to the description in the above embodiment, which will not be repeated herein; and a second determination sub-module configured for using a control variable at the first moment corresponding to the final operation state quantity at the second moment as the final control variable, wherein details refer to the description in the above embodiment, which will not be repeated herein.

In one example, a value function in a second determination module 303 is expressed as follows:

$$F(k) = \alpha_f F_f(k) + \beta_I F_I(k)$$

wherein, F(k) represents a value function at a moment k, $F_f(k)$ is a difference between a wind turbine frequency at the moment k and the predetermined frequency, $F_r(k)$ is a loss of the energy storage apparatus at the moment k, and $\alpha_f$ and $\beta_I$ are weight coefficients. Details refer to the description in the above embodiment, which will not be repeated herein.

In one example, the prediction model in the first determination module 302 comprises a phase-locked loop sub-model and a value function, and the first determination module 302 comprises:

a third determination sub-module configured for inputting different control variables at the first moment and the operation state quantity at the first moment into the phase-locked loop sub-model to obtain a plurality of wind turbine frequencies at the second moment and operation state quantities respectively corresponding to the wind turbine frequencies, wherein the control variables are in one-to-one correspondence with the wind turbine frequencies; and details refer to the description in the above embodiment, which will not be repeated herein; and a fourth determination sub-module configured for selecting the two wind turbine frequencies at the second moment, and the operation state quantities at the second moment and the control variables at the first moment respectively corresponding the two wind turbine frequencies according to the value function, wherein details refer to the description in the above embodiment, which will not be repeated herein.

In one optional embodiment, in the fourth determination sub-module, when current information corresponding to the wind turbine frequency meets a constraint condition, the step of selecting the two wind turbine frequencies at the second moment, and the operation state quantities at the second moment and the control variables at the first moment respectively corresponding the two wind turbine frequencies according to the value function is executed; and details refer to the description in the above embodiment, which will not be repeated herein.

In one optional embodiment, the constraint condition in the fourth determination sub-module is determined by a wind turbine current, a wind turbine active current and an increment thereof, a wind turbine reactive current and an increment thereof, and an energy storage apparatus current and an increment thereof; and details refer to the description in the above embodiment, which will not be repeated herein.

The specific limitations and beneficial effects of the above apparatus may refer to the above limitations of the broadband oscillation suppression method for wind-storage combination, which will not be repeated herein. The above modules may be realized in whole or in part by software, hardware and their combination. The above modules may be embedded in or independent of a processor in a computer device in a form of hardware, and may also be stored in a memory in the computer device in a form of software, so that the processor calls and executes operations corresponding to the above modules.

Figure 4:
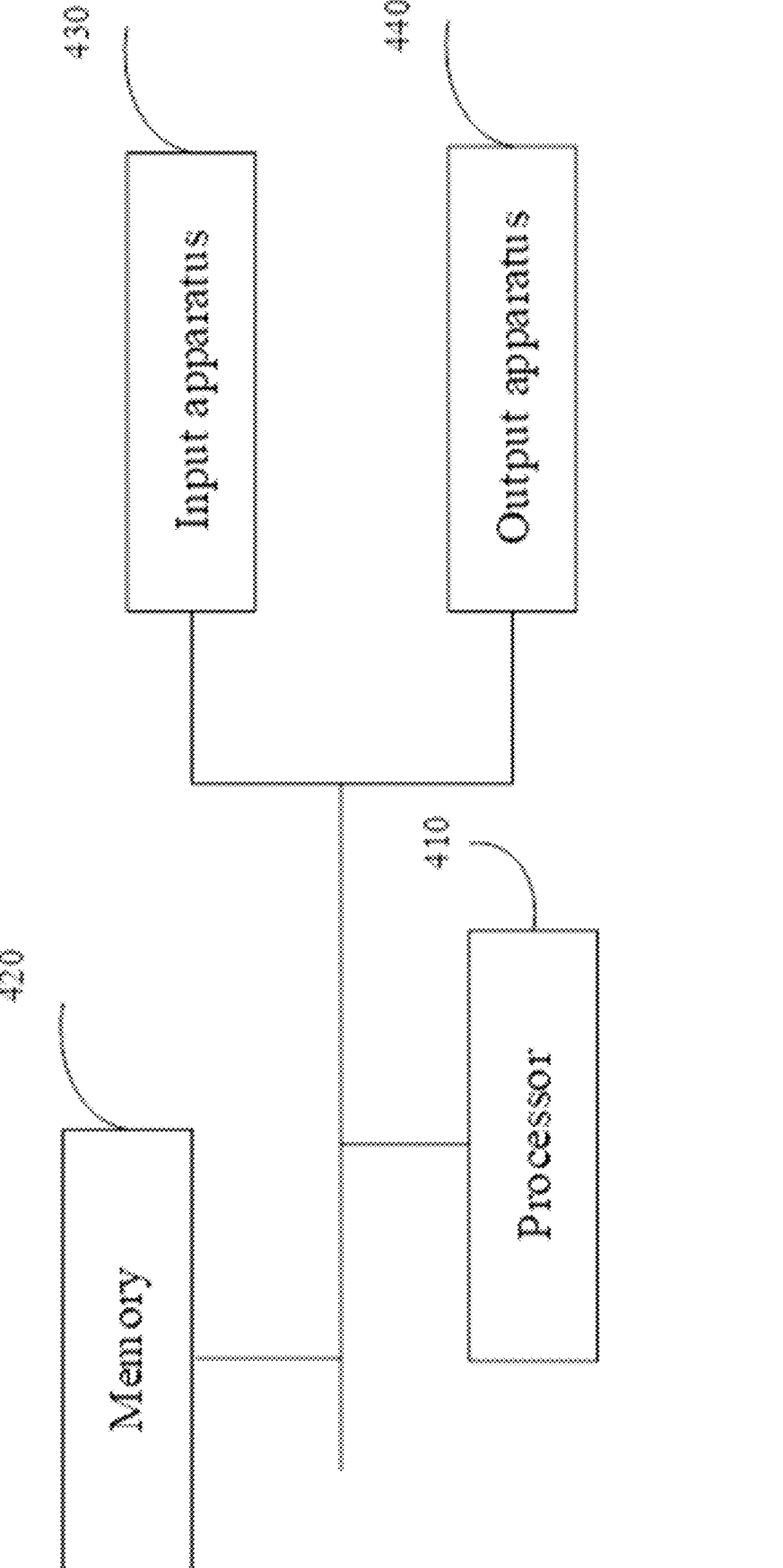
FIG. 4 is a schematic structural diagram of hardware of a computer device according to one exemplary embodiment.

FIG. 4 is a schematic structural diagram of hardware of a computer device according to one exemplary embodiment. As shown in FIG. 4, the device comprises one or more processors 410 and a memory 420, and the memory 420 comprises a persistent memory, a volatile memory and a hard disk. One processor 410 is taken as an example in FIG. 4. The device may further comprise: an input apparatus 430 and an output apparatus 440.

The processor 410, the memory 420, the input apparatus 430 and the output apparatus 440 may be connected via a bus or other ways. Bus connection is taken as an example in FIG. 4.

The processor 410 may be a Central Processing Unit (CPU). The processor 410 may also be other general-purpose processor, Digital Signal Processor (DSP), Application Specific Integrated Circuit (ASIC), Field-Programmable Gate Array (FPGA) or other programmable logic device, discrete gate or transistor logic device, discrete hardware assembly, and other chips, or a combination of the above chips. A general-purpose processor can be a microprocessor or any conventional processor.

The memory 420, as a non transient computer-readable storage medium, includes persistent memory, volatile memory, and hard disk, which can be used to store non transient software programs, non transient computer executable programs, and modules, such as the program instructions/modules corresponding to the wind storage collaborative wideband oscillation suppression method in the embodiments of the present application. The processor 410 executes various functional applications and data processing of the server by running non transient software programs, instructions, and modules stored in the memory 420, thereby achieving any of the above-mentioned wind storage collaborative wideband oscillation suppression methods.

The memory 420 may include a storage program area and a storage data area, wherein the storage program area may store an operating system and at least one application program required for a function; The storage data area can store data that needs to be used according to specific requirements. In addition, the memory 420 may include high-speed random access memory, as well as non transient memory such as at least one disk storage device, flash memory device, or other non transient solid-state storage device. In some embodiments, the memory 420 may optionally include memory remotely located relative to the processor 410, which may be connected to the data processing device via a network. Examples of the above networks include but are not limited to the Internet, enterprise intranet, local area network, mobile communication network and their combinations.

The input apparatus 430 can receive input numerical or character information, as well as generate signal inputs related to user settings and function controls. The output device 440 may include display devices such as a screen.

One or more modules are stored in the memory 420, and when executed by one or more processors 410, the method shown in FIG. 2 is executed.

The above product can execute the method provided in the embodiments of the present invention, and has corresponding functional modules and beneficial effects for executing the method. For technical details not described in detail in this embodiment, please refer to the relevant description in the embodiment shown in FIG. 2.

The embodiments of the present invention also provide a non transient computer storage medium, which stores computer executable instructions that can execute any of the suppression methods described in the embodiments. Among them, storage media can be magnetic disks, optical disks, Read Only Memory (ROM), Random Access Memory (RAM), Flash Memory, Hard Disk Drive (HDD) or Solid State Drive (SSD), etc; The storage medium may also include a combination of the above-mentioned types of memory.

What is claimed is:

1. A broadband oscillation suppression method for operating a wind-storage station system, wherein the wind-storage station system comprises a wind turbine and an energy storage apparatus, and the method comprises the following steps of:

acquiring an operation state quantity of the wind-storage station system at a first moment;

inputting a first set of control variables at the first moment and the operation state quantity at the first moment into a prediction model that comprises a phase-locked loop-model that predicts wind turbine frequency, so as to determine two wind turbine frequencies at a second moment, and operation state quantities at the second moment and a second set of control variables at the first moment respectively corresponding to the two wind turbine frequencies, wherein the second moment occurs after the first moment, the two wind turbine frequencies at the second moment are frequencies with minimum and second minimum values resulting from a value function of the prediction model, and the value function is based on a variable of the two wind turbine frequencies and a loss of the energy storage apparatus;

respectively inputting a third set of control variables at the second moment and the two operation state quantities at the second moment into the prediction model, so as to obtain wind turbine frequencies at a third moment respectively corresponding to the two operation state quantities, wherein the two wind turbine frequencies at the third moment minimize the values of the value function of corresponding operation state quantities, and the third moment occurs after the second moment; determining a control variable from the first set of control variables at the first moment corresponding to one of the two wind turbine frequencies that minimize the value of the value function at the third moment as a final control variable; and
controlling the wind turbine and the energy storage apparatus based on the final control variable.

2. The method according to claim 1, wherein, the control variable of one of the two wind turbine frequencies is a difference between one of the two wind turbine frequencies at at least one of the first moment, the second moment, or the third moment and a predetermined frequency, and the value function is obtained by summing up the difference between one of the two wind turbine frequency at at least one of the first moment, the second moment, or the third moment current moment-and the predetermined frequency and the loss of the energy storage apparatus at at least one of the first moment, the second moment, or the third moment.

3. The method according to claim 1, wherein the determining the control variable at the first moment corresponding to one of the two wind turbine frequencies that minimize the value of the value function at the third moment as the final control variable, comprises:
determining one of the two operation state quantities at the second moment corresponding to one of the two wind turbine frequencies that minimize the value of the value function at the third moment as a final operation state quantity at the second moment; and
using a control variable of the first set of control variables at the first moment corresponding to the final operation state quantity at the second moment as the final control variable.

4. The method according to claim 2, wherein the value function is expressed as follows:

$$F(k) = \alpha_f F_f(k) + \beta_I F_I(k)$$

wherein, F(k) represents a value function at a moment k, $F_f(k)$ is a difference between a wind turbine frequency at the moment k and the predetermined frequency, $F_I(k)$ is a loss of the energy storage apparatus at the moment k, and $\alpha_f$ and $\beta_I$ are weight coefficients.

5. The method according to claim 1, wherein the inputting the first set of control variables at the first moment and the operation state quantity at the first moment into the prediction model, so as to determine two wind turbine frequencies at the second moment, and the operation state quantities at the second moment and the second set of control variables at the first moment respectively corresponding to the two wind turbine frequencies, comprises:
inputting the first set of control variables at the first moment and the operation state quantity at the first moment into the phase-locked loop sub-model to obtain a plurality of wind turbine frequencies at the second moment and operation state quantities respectively corresponding to the plurality of wind turbine frequencies, wherein the output control variables are in one-to-one correspondence with the plurality of wind turbine frequencies; and
selecting the two wind turbine frequencies at the second moment, and the operation state quantities at the second moment and the second set of control variables at the first moment respectively corresponding to the two wind turbine frequencies according to the value function.

6. The method according to claim 5, wherein, after inputting the first set of control variables at the first moment and the operation state quantity at the first moment into the phase-locked loop sub-model to obtain the plurality of wind turbine frequencies at the second moment and the operation state quantities respectively corresponding to the plurality of wind turbine frequencies, and before selecting the two wind turbine frequencies at the second moment, and the operation state quantities at the second moment and the second set of control variables at the first moment respectively corresponding to the two wind turbine frequencies according to the value function, the method further comprises the following step of:
when information corresponding to the plurality of wind turbine frequencies meets a constraint condition, executing the step of selecting the two wind turbine frequencies at the second moment, and the operation state quantities at the second moment and the second set of control variables at the first moment respectively corresponding to the two wind turbine frequencies according to the value function.

7. The method according to claim 6, wherein, the constraint condition is determined by a wind turbine current, a wind turbine active current and an increment of the wind turbine active current between consecutive control time steps, a wind turbine reactive current and an increment the wind turbine reactive current between consecutive control time steps, and an energy storage apparatus current and an increment of the energy storage apparatus current between consecutive control time steps.

8. A broadband oscillation suppression apparatus for a wind-storage station system comprising a wind turbine and an energy storage apparatus, wherein the broadband oscillation suppression apparatus comprises:
an acquisition module configured for acquiring an operation state quantity of a wind-storage station system at a first moment;
a first determination module configured for inputting a first set of control variables at the first moment and the operation state quantity at the first moment into a prediction model that comprises a phase-locked loop-model that predicts wind turbine frequency, so as to determine two wind turbine frequencies at a second moment, and operation state quantities at the second moment and a second set of control variables at the first moment respectively corresponding to the two wind turbine frequencies, wherein the second moment occurs after the first moment, the two wind turbine frequencies at the second moment are frequencies with minimum and second minimum values resulting from a value function of the prediction model, and the value function is based on a variable of the two wind turbine frequencies and a loss of the energy storage apparatus;
a second determination module configured for respectively inputting the second set of control variables at the second moment and the two operation state quantities at the second moment into the prediction model, so as to obtain wind turbine frequencies at a third moment respectively corresponding to the two operation state quantities, wherein the two wind turbine frequencies at the third moment minimize the values of the value function of corresponding operation state quantities, and the third moment occurs after the second moment;

a third determination module configured for determining a control variable from the first set of control variables at the first moment corresponding to one of the two wind turbine frequencies that minimize the value of the value function at the third moment as a final control variable; and a control module configured for controlling the wind turbine and the energy storage apparatus based on the final control variable.

<div align="center">* * * * *</div>